(12) United States Patent
Rutherford et al.

(10) Patent No.: US 10,083,436 B1
(45) Date of Patent: Sep. 25, 2018

(54) ELECTRONIC PAYMENT SYSTEMS AND METHODS

(71) Applicant: ASIGNIO, INC., Sedro Woolley, WA (US)

(72) Inventors: Kyle Rutherford, Sedro Woolley, WA (US); Eric Dustrude, Sedro Woolley, WA (US); Alexander Gross, Sedro Woolley, WA (US); Calvin Rutherford, Sedro Woolley, WA (US); Kevin Boyd, Sedro Woolley, WA (US)

(73) Assignee: ASIGNIO INC., Sedro Woolley, WA (US)

( * ) Notice: Subject to any disclaimer, the term of this patent is extended or adjusted under 35 U.S.C. 154(b) by 487 days.

(21) Appl. No.: 14/501,554

(22) Filed: Sep. 30, 2014

Related U.S. Application Data (60) Provisional application No. 61/884,773, filed on Sep. 30, 2013, provisional application No. 62/017,154, filed on Jun. 25, 2014.

(51) Int. Cl.
  *G06Q 20/32* (2012.01)
  *G06Q 20/20* (2012.01)
  *G06Q 20/42* (2012.01)

(52) U.S. Cl.
  CPC ....... *G06Q 20/3278* (2013.01); *G06Q 20/202* (2013.01); *G06Q 20/42* (2013.01)

(58) Field of Classification Search
  None
  See application file for complete search history.

(56) References Cited

U.S. PATENT DOCUMENTS

| 5,347,589 | A | 9/1994 | Meeks et al. |
| 8,256,664 | B1 | 9/2012 | Balfanz et al. |
| 8,601,560 | B2 | 12/2013 | Kim et al. |
| 9,020,525 | B2 * | 4/2015 | Murphy ............... H04W 4/021 370/329 |
| 9,338,164 | B1 | 5/2016 | Liu et al. |
| 9,641,520 | B2 | 5/2017 | Neuman et al. |

(Continued)

FOREIGN PATENT DOCUMENTS

| WO | 2017087981 A2 | 5/2017 |
| WO | 2017087981 A3 | 8/2017 |
| WO | 2018132844 A1 | 7/2018 |

OTHER PUBLICATIONS

International Searching Authority, ISR & Written Opinion, PCT/US2016/063196, dated May 18, 2017, 7 pages.

(Continued)

*Primary Examiner* — Florian M Zeender
*Assistant Examiner* — Denisse Y Ortiz Roman
(74) *Attorney, Agent, or Firm* — Michael R. Schacht; Schacht Law Office, Inc.

(57) ABSTRACT

A system for processing payments from a customer to a merchant uses a merchant POS system associated with the merchant, a customer mobile device, and a payment server. The payment server generates a Transaction ID unique to a payment transaction. The customer mobile device validates the payment transaction in response to the Transaction ID. The payment server generates a payment notice when the customer mobile device validates the payment transaction. In one case, the merchant POS system presents the Transaction ID to the customer mobile device in preparation for the payment transaction.

20 Claims, 11 Drawing Sheets

(56) References Cited

U.S. PATENT DOCUMENTS

| | | |
|---|---|---|
| 9,805,182 B1 | 10/2017 | Kayyidavazhiyil et al. |
| 9,813,411 B2 | 11/2017 | Thibadeau et al. |
| 9,836,741 B2 | 12/2017 | Varadarajan et al. |
| 9,866,549 B2 | 1/2018 | Thibadeau et al. |
| 9,887,999 B2 | 2/2018 | Dong et al. |
| 2003/0182585 A1 | 9/2003 | Murase et al. |
| 2009/0210939 A1 | 8/2009 | Xu et al. |
| 2011/0047608 A1 | 2/2011 | Levenberg |
| 2011/0156867 A1 | 6/2011 | Carrizo et al. |
| 2011/0270751 A1 | 11/2011 | Csinger et al. |
| 2012/0102551 A1 | 4/2012 | Bidare |
| 2012/0330769 A1* | 12/2012 | Arceo .................. G06Q 20/32 705/21 |
| 2013/0145446 A1 | 6/2013 | Dorso et al. |
| 2013/0148024 A1* | 6/2013 | Shin ..................... G06O 20/40 348/552 |
| 2014/0007205 A1 | 1/2014 | Oikonomou |
| 2014/0282961 A1 | 9/2014 | Dorfman et al. |
| 2014/0375573 A1 | 12/2014 | Idzik et al. |
| 2015/0046276 A1* | 2/2015 | Artman ................ G06Q 20/202 705/21 |
| 2015/0071505 A1 | 3/2015 | Kim et al. |
| 2015/0237031 A1 | 8/2015 | Neuman et al. |
| 2015/0312252 A1 | 10/2015 | Potonniee |
| 2015/0334108 A1 | 11/2015 | Khalil et al. |
| 2016/0057135 A1 | 2/2016 | Jiang et al. |
| 2016/0191506 A1 | 6/2016 | Wang |
| 2016/0259895 A1 | 9/2016 | Austermann et al. |
| 2016/0314462 A1 | 10/2016 | Hong et al. |
| 2016/0337351 A1 | 11/2016 | Spencer et al. |
| 2017/0060812 A1 | 3/2017 | Williams et al. |
| 2018/0205716 A1 | 7/2018 | Rutherford et al. |

OTHER PUBLICATIONS

International Searching Authority, ISR & Written Opinion, PCT/US18/13916, dated Jun. 21, 2018, 8 pages.

USPTO, "Non-Final Office Action, U.S. Appl. No. 15/358,052," dated Jul. 5, 2018, 13 pages.

* cited by examiner

ELECTRONIC PAYMENT SYSTEMS AND METHODS

RELATED APPLICATIONS

This application, U.S. application Ser. No. 14/501,554 filed Sep. 30, 2014, claims benefit of U.S. Provisional Patent Applications Ser. Nos. 61/884,773 filed Sep. 30, 2013, and 62/017,154 filed Jun. 25, 2014.

The contents of all related patent applications listed above are incorporated herein by reference.

TECHNICAL FIELD

The present invention relates to systems and methods for facilitating point of sale payments and, more specifically, to electronic payment systems and methods that facilitate and verify payments made electronically.

BACKGROUND

Merchants often use electronic payment services to accept payments from a customer. Currently, the most common form of electronic payment in the United States uses card with a magnetic stripe (e.g., credit card, debit card, gift card). The magnetic stripe contains data that may be read by swiping the stripe past a magnetic reading head. Magnetic stripe cards may further comprise an RFID tag, transponder device, and/or microchip.

In addition, mobile payment services may be implemented using a smart phone or other portable processing device. A mobile payment service digitizes and replaces the magnetic stripe card. In general, the portable processing device wirelessly communicates with point of sale (POS) systems using a near field communication (NFC) antenna.

The need exists for making electronic payment services, and in particular mobile payment services, more secure and easy to use.

SUMMARY

The present invention may be embodied as a system for processing payments from a customer to a merchant comprising a merchant POS system associated with the merchant, a customer mobile device, and a payment server. The payment server generates a Transaction ID unique to a payment transaction. The customer mobile device validates the payment transaction in response to the Transaction ID. The payment server generates a payment notice when the customer mobile device validates the payment transaction. In one example implementation, the merchant POS system presents the Transaction ID to the customer mobile device in preparation for the payment transaction. In another example implementation, a static code is associated with the merchant POS system, and the customer mobile device reads the static code and transmits the static code to the payment server. In response to receipt of the static code, the payment server sends a PIN/Key code to the customer mobile device. The customer mobile device displays the PIN/Key code. The customer enters the PIN/Key code into the merchant POS system, and the payment server generates the Transaction ID when the entered PIN/Key code is valid.

The present invention may also be embodied as a method for processing payments from a customer using a customer mobile device to a merchant using a merchant POS system comprising the following steps. A merchant application is run on the merchant POS system. A customer application is run on the customer mobile device. The customer application is caused to validate a payment transaction based on a Transaction ID unique to the payment transaction. A payment notice is generated when the customer mobile device validates the payment transaction.

DETAILED DESCRIPTION

The present invention may be embodied in a number of forms, and several examples of the present invention will be discussed separately below.

I. Example Electronic Payment System

Figure 1:
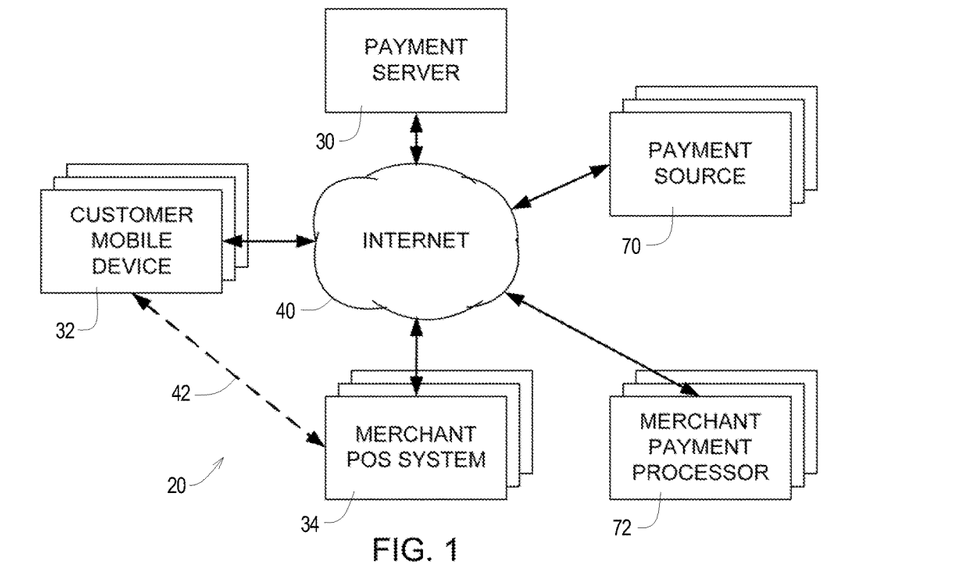
FIG. 1 is a block diagram of an example system for processing electronic payments.

Referring initially to FIG. 1 of the drawing, depicted therein is an example electronic payment processing system 20 constructed in accordance with, and embodying, the principles of the present invention. The example payment processing system 20 comprises a payment server 30, a customer mobile device 32, and a merchant point of sale (POS) system 34. The payment server 30 is a computing system that runs software capable of storing data and performing payment server logic operations as will be discussed below. The customer mobile device 32 is a portable computing device such as a cell-phone, smart phone, tablet, laptop, or the like that runs software capable of storing data and performing customer logic operations as will be discussed below. The merchant POS system 34 is a computing device such as a cell-phone, smart phone, tablet, laptop, cash register, credit-card swipe machine, or the like that runs software capable of storing data and performing merchant logic operations as will be discussed below.

As shown by solid lines in FIG. 1, the payment server 30, customer mobile device 32, and merchant POS system 34 are connected to each other through a first communications system 40 such as the internet. And as shown by even-dashed lines in FIG. 1, the customer mobile device 32 and merchant POS system 34 are directly connected to each other through a second communications system 42 such as a visual system (e.g., Quick Response (QR) code display and sensor), Bluetooth system, and/or Near Field Communication (NFC) system. Typically, the payment processing system 20 will comprise multiple customer mobile devices 32 and multiple merchant POS systems 34.

Figure 2:
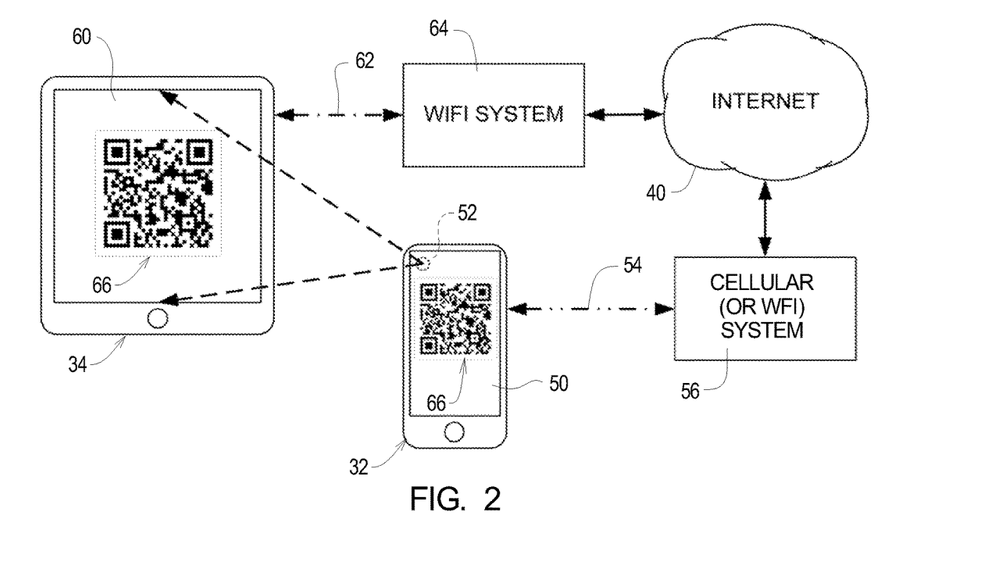
FIG. 2 is a block diagram illustrating one example implementation of a portion of the example electronic payment processing system of FIG. 1.

FIG. 2 illustrates that the example customer mobile device 32 may be, for example, an iPhone comprising an input device such as a touch sensitive screen 50 and a camera 52. The iPhone forming the example customer mobile device 32 is operatively connected to a cellular communications system 54 that allows the customer mobile device 32 to transmit data to and received data from a cellular system 56. The cellular system 56 is in turn connected to the first communications system 40. FIG. 2 also illustrates that the example merchant POS system 34 may be, for example, an iPad comprising a display device 60. The iPad forming the example merchant POS device 32 comprises a WiFi communications system 62 that allows the merchant POS device 32 to transmit data to and received data from a WiFi system 64. The WiFi system 64 is also connected to the first communications system 40.

More specifically, FIG. 2 shows that the example display device 60 of the iPad forming the merchant POS device 34 is capable of displaying a QR code 66, and the camera 52 of the iPhone forming the example customer mobile device 32 is capable of generating image data representative of the QR code 66 such that the QR code 66 may be displayed by the display device 60. The QR image data may also be used to display the QR code 66 on the touch sensitive screen 50 and/or to transmit the QR code 66 to the first communications system 40 through the cellular communications system 54.

Referring now back to FIG. 1, it can be seen that the example payment processing system 20 may further comprise a payment source 70 and a merchant payment processor 72 for facilitating the transfer of funds from a payer associated with the customer mobile device 32 and a payee associated with the merchant POS system 34. The example payment processing system 20 will typically comprise multiple payment sources 70 and multiple merchant payment processors 72. The payment sources 70 are typically associated with e-commerce companies such as banks, lending institutions, and/or credit card companies authorized to make payment on behalf of the payer associated with the customer mobile device 32. The merchant payment processors 72 are typically e-commerce companies such as banks, credit card services companies, and/or payment processing companies (e.g., PayPal) authorized to receive payment on behalf of the payee associated with the merchant POS system 34. The customer mobile devices 32 are thus associated with one or more of the payment sources 70. Similarly, the merchant POS systems 34 are associated with one or more of the merchant payment processors 72. It is possible that the payment source 70 and the merchant payment processor 72 are the same entity for a given transaction.

II. First Example Electronic Payment Method

Figure 3:
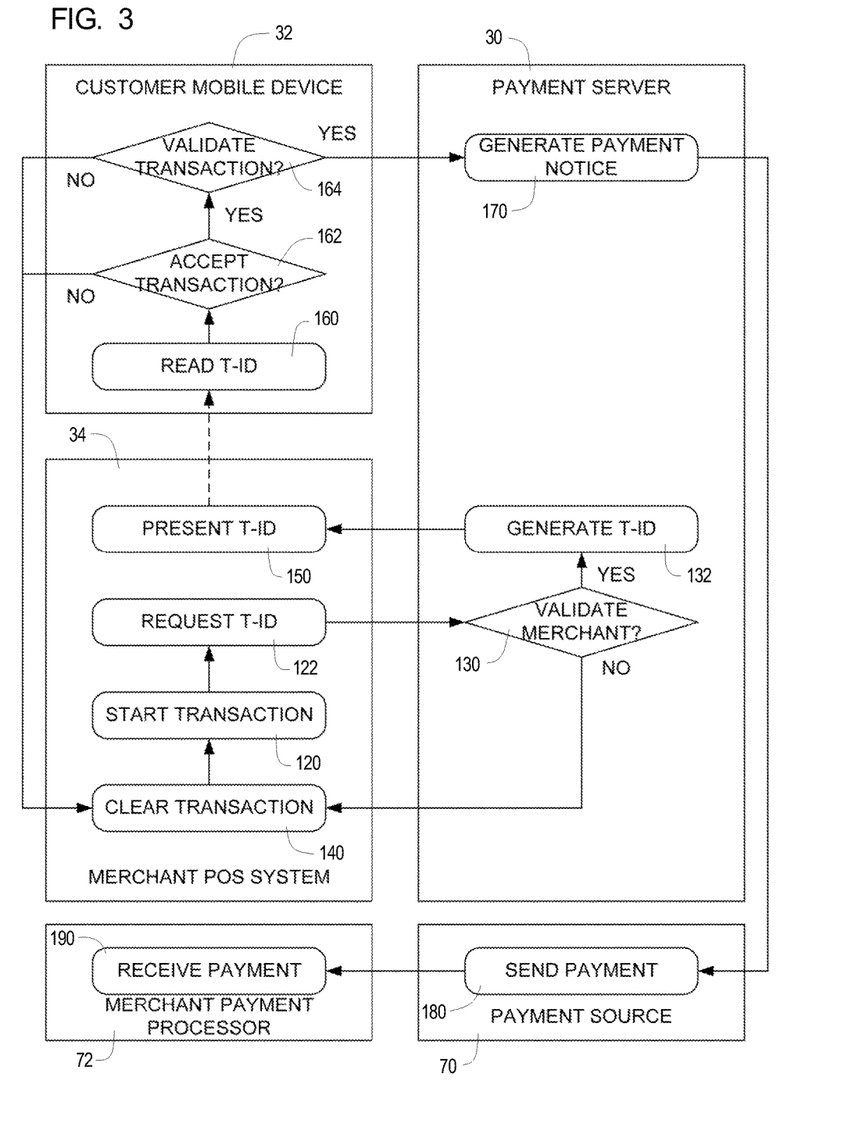
FIG. 3 is a flow chart illustrating the interactions among the components of the example electronic payment processing system of FIG. 1 when performing a first example electronic payment processing method.

Referring now to FIG. 3 of the drawing, depicted therein is a first example electronic payment method of the present invention. The first example electronic payment method depicted in FIG. 3 is performed by software running on the payment server 30, the customer mobile devices 32, the merchant POS system 34, the payment sources 70, and the merchant payment processors 72.

In the first example electronic payment method, the process is initiated at a Start Transaction step 120 performed by the merchant POS system 34. After the process is initiated at step 120, the merchant POS system 34 generates transaction identification (T-ID) request at a Request T-ID step 122. The T-ID request is transmitted to the payment server 30, which determines whether the T-ID request comes from a valid merchant at Validate Merchant step 130. The first communication system 40 is used to communicate data representing the T-ID request from the merchant POS system 34 to the payment server 30. If the merchant is validated at step 130, the payment server 30 generates a T-ID at a Generate T-ID step 132. If the merchant is not validated at step 130, the process proceeds to a Clear Transaction step 140 and the process is terminated.

The T-ID generated by the payment server 30 is transmitted back to the merchant POS system 34 after the Generate T-ID step 132. The first communication system 40 is used to communicate data representing the T-ID from the payment server 30 to the merchant POS system 34.

At a Present T-ID step 150, the merchant POS system presents the T-ID to the customer mobile device 32 such that T-ID is transmitted in some fashion directly from the merchant POS system 34 to the customer mobile device 32. The second communications system 42 is used to communicate the data representing the T-ID from the merchant POS system 34 to the customer mobile device 32.

After the customer mobile device 32 has read the T-ID at a Read T-ID step 160, the customer mobile device 32 allows the payer operating the customer mobile device 32 to decide whether to accept the transaction at an Accept Transaction step 162. If the payer declines to accept the transaction at step 162, the process returns to the Clear Transaction step 140.

If the payer accepts the transaction at step 162, the customer mobile device 32 requires the payer to validate the transaction at a Validate Transaction step 164. If the payer does not successfully validate the transaction at step 164, the process returns to the Clear Transaction step 140.

If the payer successfully validates the transaction at step 164, the customer mobile device 32 sends confirmation data to the payment server 30. The first communication system 40 is used to communicate the confirmation data from the customer mobile device 32 to the payment server 30.

When the payment server 30 receives the confirmation data, the payment server 30 generates payment initiation data at a Generate Payment Notice step 170, and the payment server 30 sends a payment initiation notice containing the payment initiation data to the payment source 70. The first communication system 40 is used to communicate the payment initiation data from the payment server 30 to the payment source 70.

When the payment source 70 receives the payment notice, the payment source 70 generates payment completion data at a Send Payment step 180. The payment source 70 sends a payment completion notice containing the payment completion data to the merchant payment processor 72. The first communication system 40 is used to communicate the payment completion data from the payment source 70 to the merchant payment processor 72. When the merchant payment processor 72 receives the payment completion notice, the funds are withdrawn from the payer's account and then deposited in the payee's account at a Receive Payment step 190.

III. Second Example Electronic Payment Method

Figure 4:
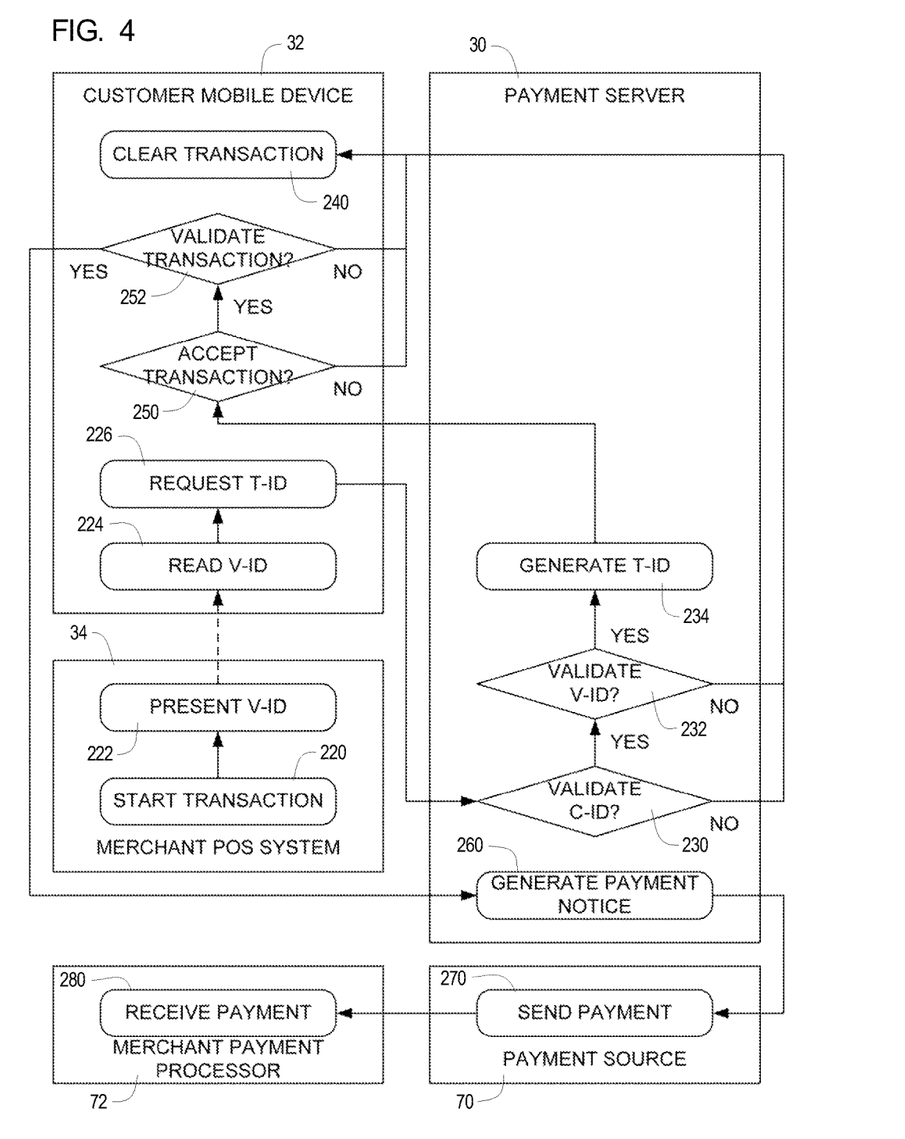
FIG. 4 is a flow chart illustrating the interactions among the components of the example electronic payment processing system of FIG. 1 when performing a second example electronic payment processing method.

Referring now to FIG. 4 of the drawing, depicted therein is a second example electronic payment method of the present invention. The second example electronic payment method depicted in FIG. 4 is performed by software running on the payment server 30, the customer mobile devices 32, the merchant POS system 34, the payment sources 70, and the merchant payment processors 72.

In the second example electronic payment method, the process is initiated at a Start Transaction step 220 performed by the merchant POS system 34. However, unlike with the first example electronic payment method, the merchant POS system 34 does not generate a T-ID request in the second example electronic payment method. Instead, the customer mobile device 32 generates the T-ID request after obtaining the V-ID from the merchant POS system 34.

In particular, in the second example electronic payment method, the merchant POS system 34 presents the V-ID to the customer mobile device 32 at a Present V-ID step 222. Using the second communication system 42, the customer mobile device 32 reads the V-ID at a Read V-ID step 224. After reading the V-ID at step 224, the customer mobile device 32 generates a T-ID request at step 226.

The customer mobile device 32 then transmits the T-ID request to the payment server 30 using the first communication system 40. The T-ID request contains the V-ID obtained from the merchant POS system 34, the C-ID stored in the customer mobile device 32, and details of the proposed transaction. The payment server 30 determines whether the T-ID request comes from a valid customer and merchant by performing a Validate C-ID step 230 and a Validate V-ID step 232. If the merchant and customer are validated at steps 230 and 232, the payment server 30 generates a T-ID at a Generate T-ID step 234. If either the merchant or the customer is not validated at steps 230 and 232, the process proceeds to a Clear Transaction step 240, and the process is terminated.

The T-ID generated by the payment server 30 is then transmitted back to the merchant POS system 34 after the Generate T-ID step 234. The first communication system 40 is used to communicate data representing the T-ID from the payment server 30 to the merchant POS system 34.

After the customer mobile device 32 has obtained the T-ID, the customer mobile device 32 allows the payer operating the customer mobile device 32 to decide whether to accept the transaction at an Accept Transaction step 250. If the payer declines to accept the transaction at step 250, the process returns to the Clear Transaction step 240.

If the payer accepts the transaction at step 250, the customer mobile device 32 requires the payer to validate the transaction at a Validate Transaction step 252. If the payer does not successfully validate the transaction at step 252, the process returns to the Clear Transaction step 240.

If the payer successfully validates the transaction at step 252, the customer mobile device 32 sends confirmation data to the payment server 30. The first communication system 40 is used to communicate the confirmation data from the customer mobile device 32 to the payment server 30.

When the payment server 30 receives the confirmation data, the payment server 30 generates payment initiation data at a Payment Notice step 260, and the payment server 30 sends a payment initiation notice containing the payment initiation data to the payment source 70. The first communication system 40 is used to communicate the payment initiation data from the payment server 30 to the payment source 70.

When the payment source 70 receives the payment notice, the payment source 70 generates payment completion data at a Send Payment step 270. The payment source 70 sends a payment completion notice containing the payment completion data to the merchant payment processor 72. The first communication system 40 is used to communicate the payment completion data from the payment source 70 to the merchant payment processor 72. When the merchant payment processor 72 receives the payment completion notice, the funds are withdrawn from the payer's account and then deposited in the payee's account at a Receive Payment step 280.

IV. Example Validate Transaction Step

Figure 5:
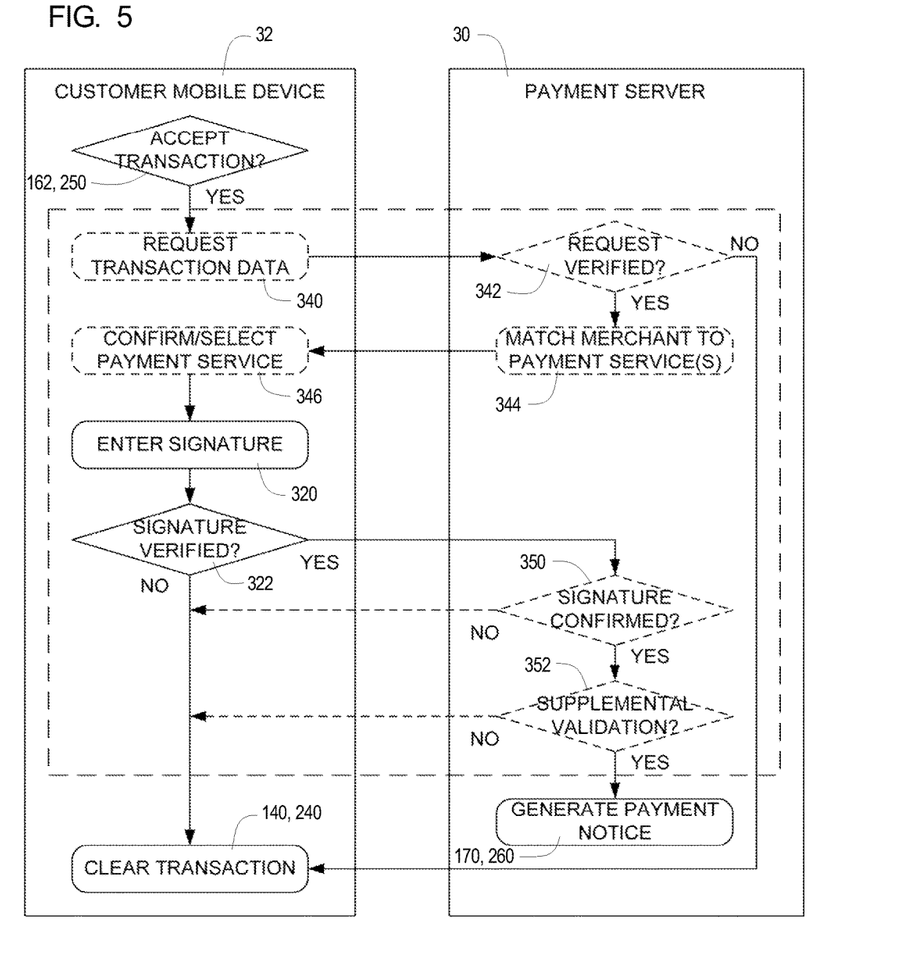
FIG. 5 is a flow chart illustrating the interactions among certain of the components of the example electronic payment processing system of FIG. 1 when performing a step of validating a transaction in either of the first or second example electronic payment processing methods.

Turning now to FIG. 5 of the drawing, depicted therein is an example process for performing a Validate Transaction step that may be implemented by an electronic payment method of the present invention, such as either of the first and second example electronic payment methods described above.

After an Accept Transaction step, such as either of the steps 162 or 250 as depicted in FIGS. 3 and 4, a user of the customer mobile device enters one or more signatures at an Enter Signature step 320. The entered signature(s) is verified at a Verify Signature step 322. If the signature is verified at step 322, the process proceeds to a Generate Payment Notice step, such as either of the steps 170 or 260 as depicted in FIGS. 3 and 4. If the signature is not verified at step 322, the process proceeds to a Clear Transaction step, such as either of the steps 140 and 240 as depicted in FIGS. 3 and 4.

In the context of the present invention, the term "signature" refers to a unique identifier for a particular individual. The customer mobile device 32 is provided with a user input device or sensor that facilitates the detection of the unique identifier. One commonly accepted example of such a unique identifier is a handwritten signature. As shown for example in FIG. 6, the customer mobile device 32 may be provided with a touch sensitive screen 50 to allow the handwritten signature 330 (solid lines) to be entered and compared with a reference signature 332 (broken lines) as will be explained in further detail below.

Figure 6:
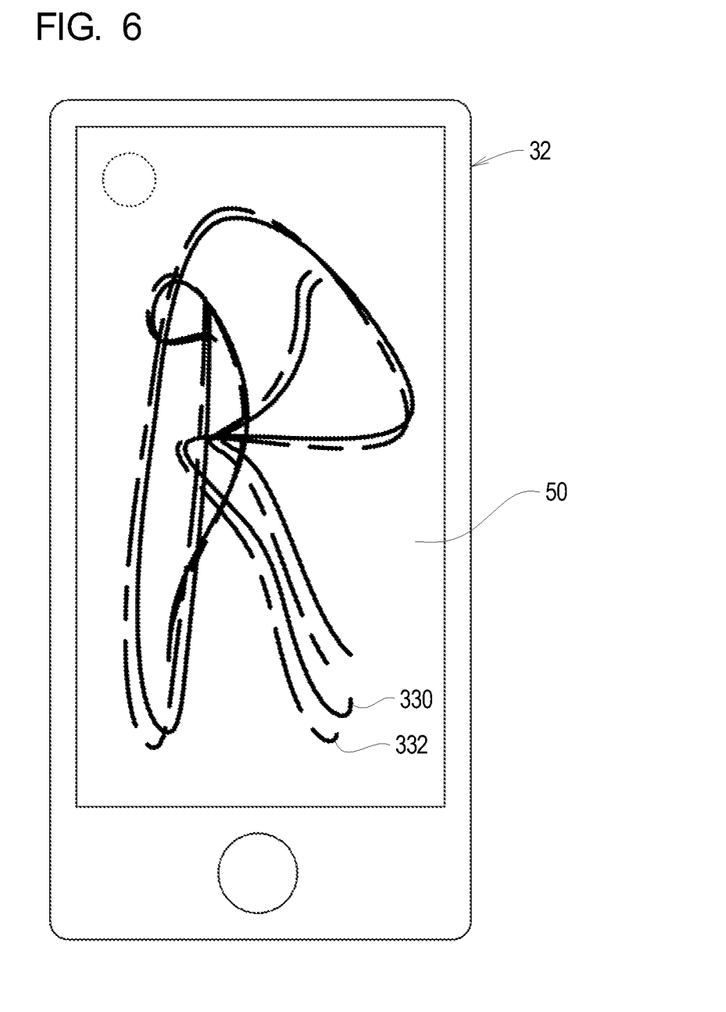
FIG. 6 illustrates the entry of a signature into a customer mobile device using a touch screen thereof as part of the step of validating a transaction as depicted in FIG. 5.

In particular, the reference signature 332 is depicted in FIG. 6 for illustrative purposes only and would, in fact, not be displayed by the customer mobile device 32. The handwritten signature 330 will be displayed as formed by the individual authorizing the transaction using the customer mobile device 32. The handwritten signature 330 will be compared in software with the reference signature 332, and the handwritten signature 330 will be verified only when it deviates no more than a predetermined amount from the reference signature 332. As can be seen in FIG. 6, the handwritten signature 330 substantially matches the reference signature 332 and would likely be verified.

Alternative unique identifiers include biometric identifiers such as fingerprint data and retina data. In either case, specialized sensors and processing may be used to generate data associated with an individual's fingerprint or retina that may be used verify that the user of the customer mobile device 32 is the particular individual authorized to make payment with a particular payment source.

FIG. 5 further illustrates that the example Validate Transaction process may include a number of optional steps as indicated by broken lines.

As one option, example Accept Transaction step may allow the customer to confirm or select one or more payment services associated with the merchant. In particular, the customer mobile device 32 may generate a Transaction Data request at a Request Transaction Data step 340. The Transaction Data request is verified by the payment server 30 at a Request Verified step 342. If the Transaction Data request is not verified at step 342, the process proceeds to the Clear Transaction step, and the process terminates. If the Transaction Data request is verified at step 342, the merchant is matched to associated payment services at step 344. Data associated with matching payment services is then transmitted to the customer mobile device 32. The customer may then confirm or select a payment service at a Confirm/Select Payment Source step 346. At that point, the example Validate Transaction step moves to the Enter Signature step 320.

As another option, the Accept Transaction step may include additional verification performed by the payment server 30. In particular, after the customer mobile device 32 verifies the signature at the Confirm Signature step 322, the payment server 30 can perform one or both of a Signature Confirmed step 350 and a Supplemental Validation step 352. If the verification of the signature is not confirmed at the Signature Confirmed step 350, the process proceeds to the Clear Transaction step. The process also proceeds to the Clear Transaction step if the supplemental validation fails at the Supplemental Validation step 352. If the verification of the signature is confirmed at the Signature Confirmed step 350 and the supplemental validation does not fail at the Supplemental Validation step 352, the process proceeds to the Generate Payment Notice step.

The supplemental validation performed by the Supplemental Validation step 352 may be any additional information that may be used to confirm that the individual in possession of the customer mobile device is authorized to make payment using a particular payment source. For example, the supplemental validation may question a transaction if the merchant POS system is located in a geographical area not typically frequented by the authorized individual. As another example, supplemental validation may take the form of having the operator of the merchant POS system 34 to check the identification papers of the individual in possession of the customer mobile device 32. As yet another example, the supplemental validation may take the form of additional biometric identification beyond that performed in the Signature Verified step 322.

V. Example Optional Steps

Figure 7:
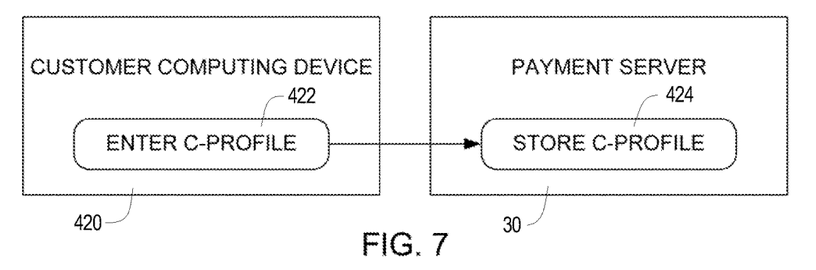
FIG. 7 is a flow chart illustrating the interactions among certain of the components of the example electronic payment processing system of FIG. 1 when performing an optional step of creating a customer profile.

FIG. 7 illustrates the process of creating a customer profile (C-Profile) on the payment server 30. The authorized individual will use the customer mobile device 32 or any other computing device such as a personal computer 420 capable of communicating with the payment server 30 to create a C-Profile by entering data at a step 422 using the customer computing device 420. The payment server 30 stores the data as the C-Profile at a step 424. The C-Profile allows the payment server 30 to establish a connection with the one or more of the payment sources 70 associated with the authorized user creating the C-Profile. The C-Profile will typically be established in advance of performing an electronic payment method of the present invention.

Figure 8:
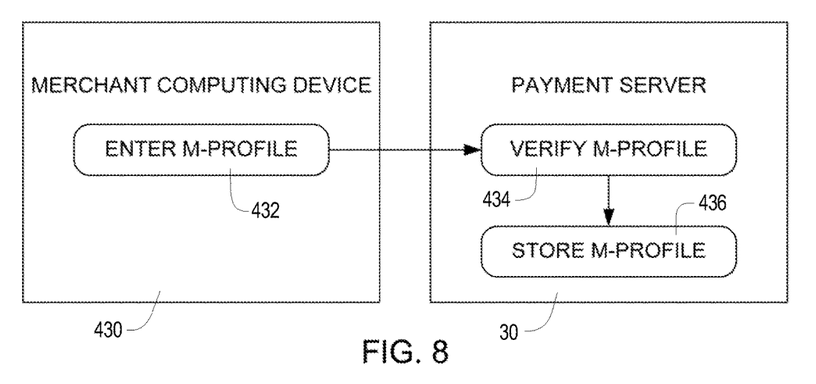
FIG. 8 is a flow chart illustrating the interactions among certain of the components of the example electronic payment processing system of FIG. 1 when performing an optional step of creating a merchant profile.

FIG. 8 illustrates the process of creating a merchant profile (M-Profile). The merchant will use a computing device such as a workstation 430 to enter data to create the M-Profile at a step 432. The payment server 30 verifies the M-Profile at a step 434 and stores the M-Profile at a step 436.

Figure 9:
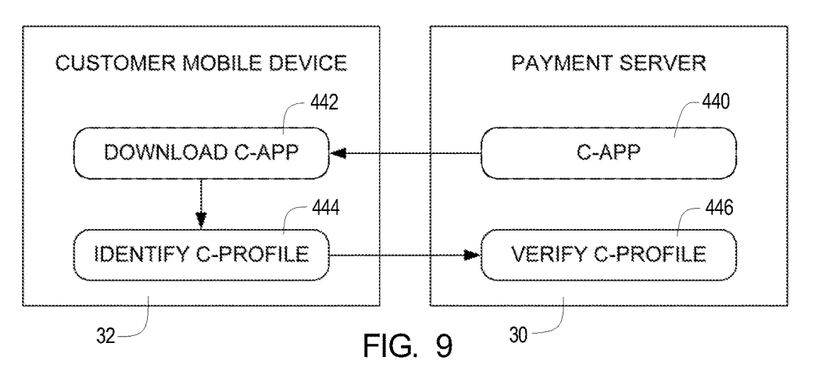
FIG. 9 is a flow chart illustrating the interactions among certain of the components of the example electronic payment processing system of FIG. 1 when performing an optional step of a downloading a customer application.

FIG. 9 illustrates the process of downloading a customer mobile application (C-App) 440 from the payment server 30 to the customer mobile device 32. The user of the mobile device downloads the C-App 440 at a step 442. The user then identifies a C-Profile using the C-App 440 at a step 444, and the payment server 30 verifies the C-Profile identified at step 444 at a step 446.

Figure 10:
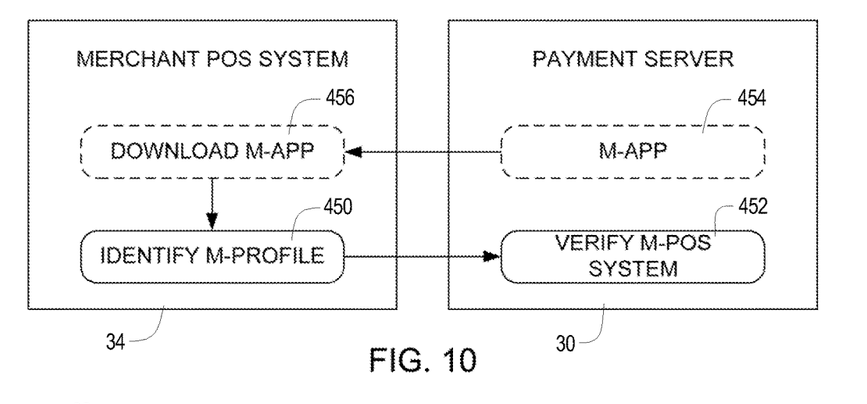
FIG. 10 is a flow chart illustrating the interactions among certain of the components of the example electronic payment processing system of FIG. 1 when performing an optional step of a downloading a merchant application.

FIG. 10 illustrates the process of associating a particular M-Profile with a particular merchant POS system. The merchant uses the merchant POS system 34 to identify the appropriate M-Profile at a step 450. The identified M-Profile is then transmitted to the payment server 30 for verification at a step 452. Optionally, the merchant can, if necessary, download a merchant mobile application (M-App) 454 at a step 456 prior to identifying the appropriate M-Profile at step 450.

FIGS. 11 and 12A-12D illustrate the process of preparing the customer mobile device 32 to authenticate the identity of the user by creating a reference signature such as the reference signature 332 described above. The process depicted in FIG. 11 assumes that the customer mobile device 32 is loaded with the C-App and that the user has set up a C-Profile. To create the reference signature 332, the user first uses the customer mobile device 32 to identify the appropriate C-Profile at a step 460. The payment server 30 verifies the C-Profile at step 462.

Figure 12A:
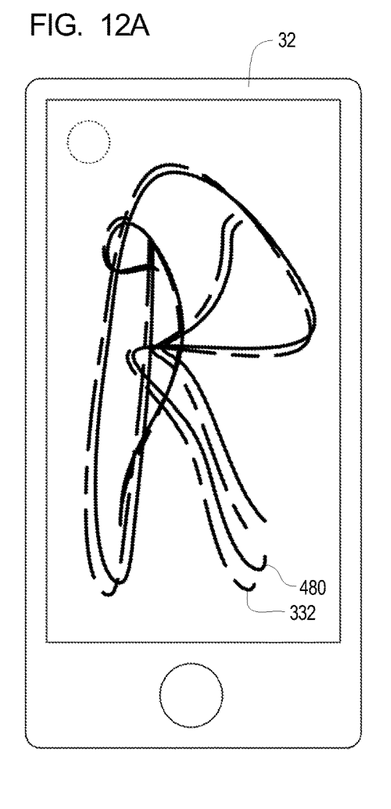
FIGS. 12A-12D illustrating the process of establishing a reference signature for use in the example validation step depicted in FIG. 11.

At a step 470, the user enters a first (calibration) signature using the customer mobile device 32 as generally described above. FIG. 12A shows both the first signature as represented by solid lines 480 and also represents the reference signature 332 using dotted lines. Again, the dotted lines are not actually displayed by the customer mobile device 32 but are depicted in FIG. 12A to provide a reference point to illustrate the ultimate creation of the reference signature 332. The customer mobile device data associated with the first signature 480 is stored by the customer mobile device 32.

Figure 12B:
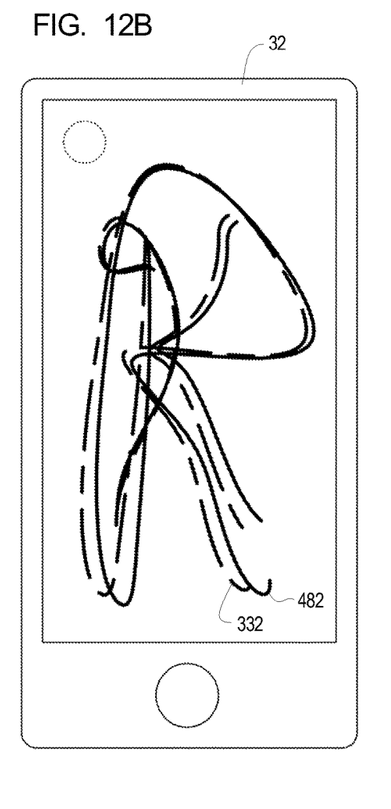

At a step 472, the user enters a second (calibration) signature using the customer mobile device 32. FIG. 12B shows both the second signature as represented by solid lines 482 and also represents the reference signature 332 using dotted lines. Again, the dotted lines are not actually displayed by the customer mobile device 32 but are depicted in FIG. 12B to provide a reference point to illustrate the ultimate creation of the reference signature 332. The customer mobile device data associated with the second signature 482 is stored by the customer mobile device 32. Variations between the first and second signatures 480 and 482 are used to generate a first iteration of the reference signature 332 at a step 474.

Figure 12C:
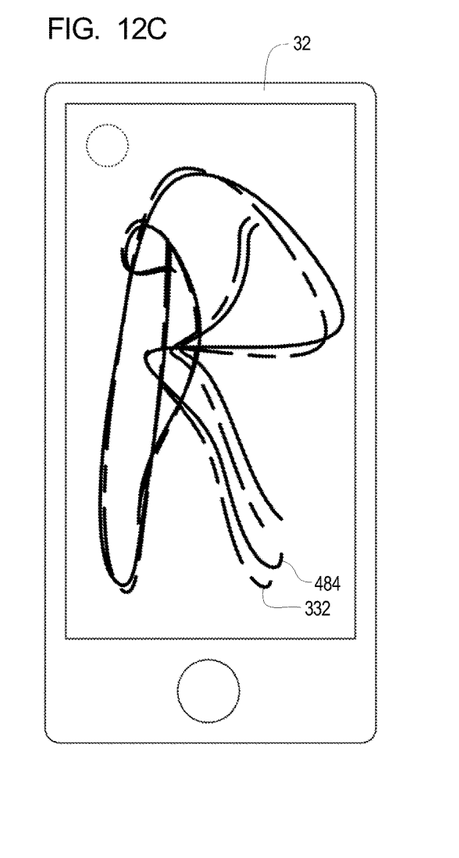

The process then returns to step 472, at which point the user enters a third (calibration) signature using the customer mobile device 32. FIG. 12C shows both the third signature as represented by solid lines 484 and also represents the reference signature 332 using dotted lines. Again, the dotted lines are not actually displayed by the customer mobile device 32 but are depicted in FIG. 12C to provide a reference point to illustrate the ultimate creation of the reference signature 332. The customer mobile device data associated with the third signature 484 is stored by the customer mobile device 32. Variations between the first, second, and third signatures 480, 482, and 484 are used to generate a first iteration of the reference signature 332 at the step 474.

Figure 11:
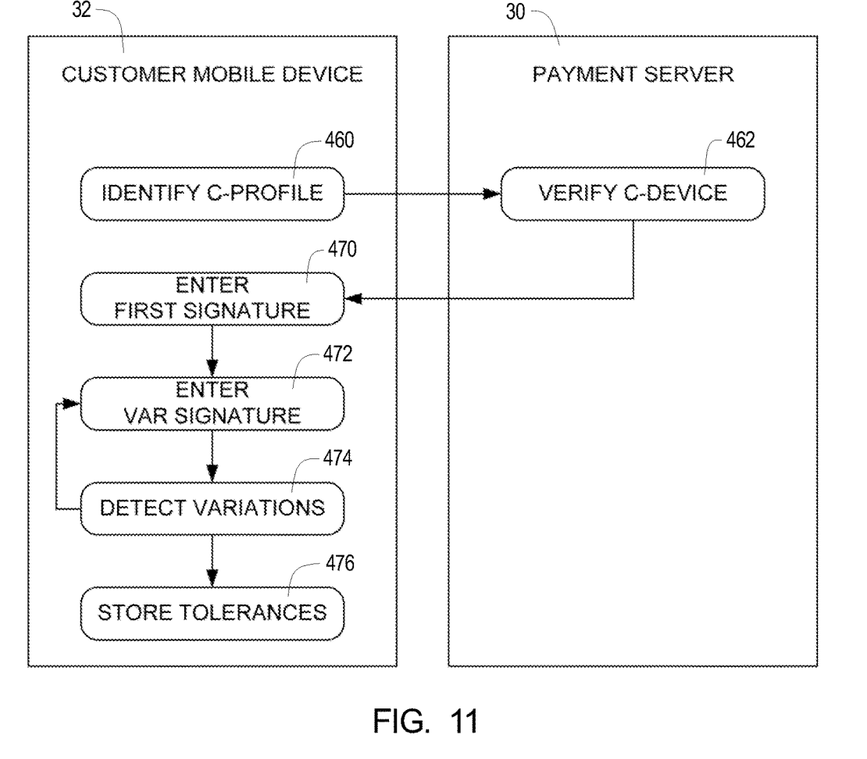
FIG. 11 is a flow chart illustrating the interactions among certain of the components of the example electronic payment processing system of FIG. 1 when performing an optional step of verifying the customer's signature when performing the step of validating a transaction in either of the first or second example electronic payment processing methods.
Figure 12D:
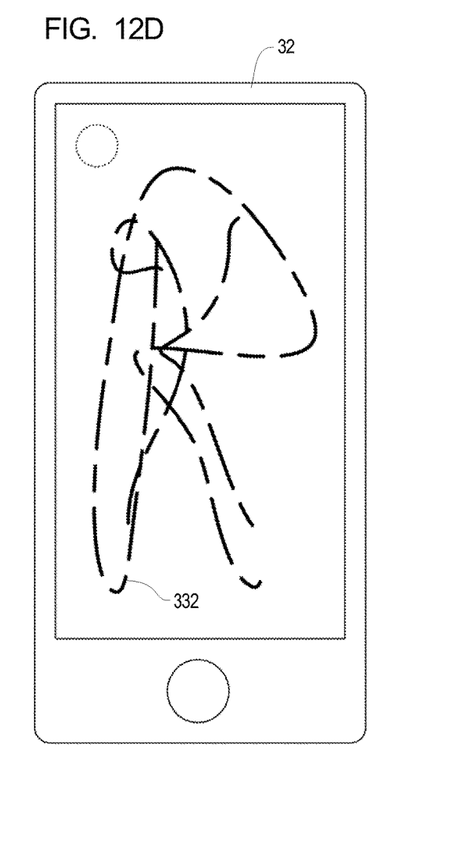

After enough signature entries to create a reference signature representative of tolerances among all of the various signatures 480, 482, and 484, plus any additional signatures entered as may be necessary to reduce the likelihood of error during the validation process, the reference signature 332 may be represented by a reference signature as shown by FIG. 12D, and FIG. 11 shows that acceptable variances from the reference signature are stored as tolerances at step 476. The reference signature 332 in conjunction with the variations as stored at step 476 thus incorporates variation data indicative of normal variations of actual signatures from the reference signature that are acceptable when determining whether a particular signature is valid.

VI. Variations on Electronic Payment Method

As shown in and described in connection with FIGS. 13-15, the principles of the present invention may also be embodied in an example payment processing system 520 in which the combination of a "static" code (one that is not dynamically generated for each transaction) and a delivered PIN or Key Code may be used to identify a particular transaction. The example payment processing system 520 comprises a payment server 530, a customer mobile device 532, and a merchant point of sale (POS) system 534. The payment server 530 is a computing system that runs software capable of storing data and performing payment server logic operations as will be discussed below. The customer mobile device 532 is a portable computing device such as a cell-phone, smart phone, tablet, laptop, or the like that runs software capable of storing data and performing customer logic operations as will be discussed below. The merchant POS system 534 is a computing device such as a cell-phone, smart phone, tablet, laptop, cash register, credit-card swipe machine, or the like that runs software capable of storing data and performing merchant logic operations as will be discussed below.

Figure 13:
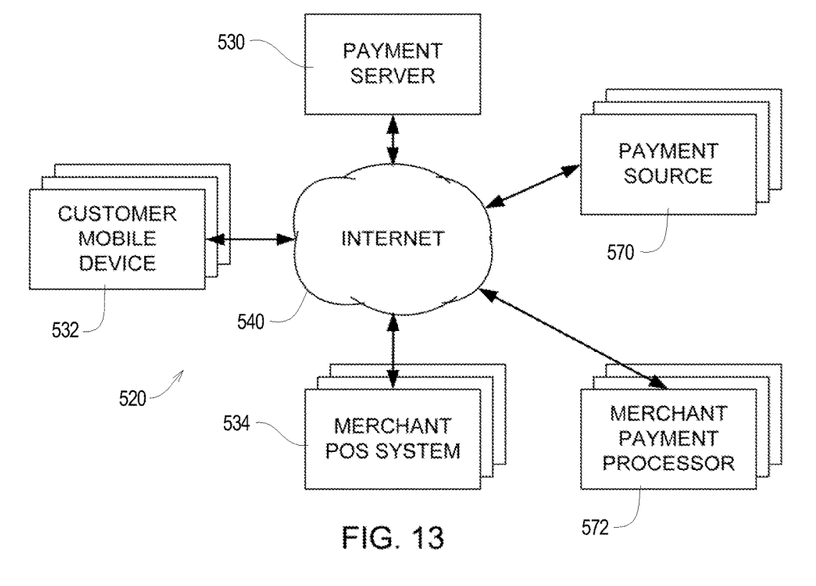
FIG. 13 is a block diagram of another example system for processing electronic payments.

As shown by solid lines in FIG. 13, the payment server 530, customer mobile device 532, and merchant POS system 534 are connected to each other through a first communications system 540 such as the internet. Typically, the payment processing system 520 will comprise multiple customer mobile devices 532 and multiple merchant POS systems 534. FIG. 13 also shows that, in the example payment processing system 520, the example customer mobile device 532 and merchant POS system 534 are not in direct communication.

Figure 14:
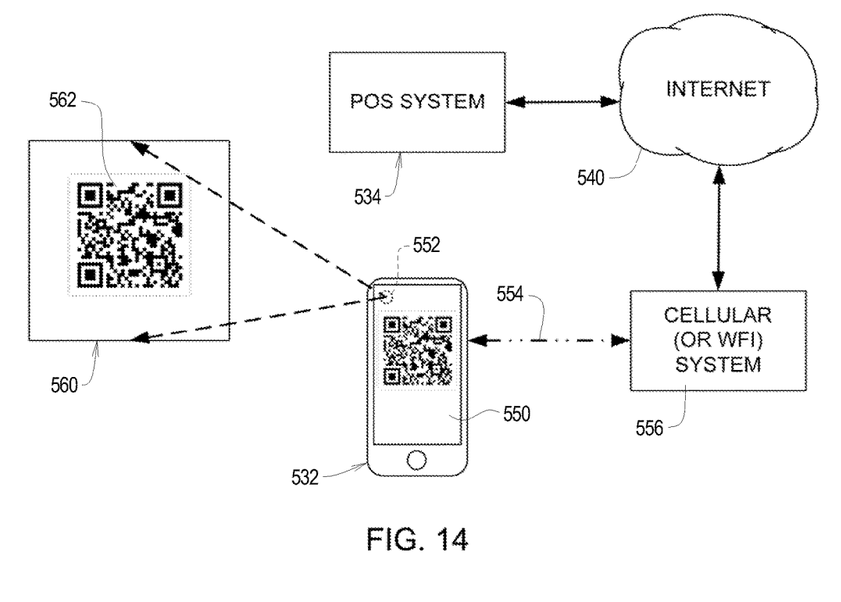
FIG. 14 is a block diagram illustrating one example implementation of a portion of the example electronic payment processing system of FIG. 13.

FIG. 14 illustrates that the example customer mobile device 532 may be, for example, an iPhone comprising an input device such as a touch sensitive screen 550 and a camera 552. The iPhone forming the example customer mobile device 532 is operatively connected to a cellular communications system 554 that allows the customer mobile device 532 to transmit data to and received data from a cellular system 556. The cellular system 556 is in turn connected to the first communications system 540.

FIG. 14 also illustrates that a display device 560 is associated with the example merchant POS system 534. The example merchant POS device 534 is operatively connected to the first communications system 540. FIG. 14 also shows that the example display device 560 associated with the example merchant POS device 534 is capable of displaying a "static" code 562. The camera 552 of the iPhone forming the example customer mobile device 532 is capable of generating image data such that the "static" code 562 may be displayed by the display device 560. The iPhone forming the example customer mobile device 532 is also capable of generating "static" code data representative of the "static" code 562 based on the image data generated by the camera 552.

Referring now back to FIG. 13, it can be seen that the example payment processing system 520 may further comprise a payment source 570 and a merchant payment processor 572 for facilitating the transfer of funds from a payer associated with the customer mobile device 532 and a payee associated with the merchant POS system 534. The example payment processing system 520 will typically comprise multiple payment sources 570 and multiple merchant payment processors 572. The payment sources 570 are typically associated with e-commerce companies such as banks, lending institutions, and/or credit card companies authorized to make payment on behalf of the payer associated with the customer mobile device 532. The merchant payment processors 572 are typically e-commerce companies such as banks, credit card services companies, and/or payment processing companies (e.g., PayPal) authorized to receive payment on behalf of the payee associated with the merchant POS system 534. The customer mobile devices 532 are thus associated with one or more of the payment sources 570. Similarly, the merchant POS systems 534 are associated with one or more of the merchant payment processors 572. It is possible that the payment source 570 and the merchant payment processor 572 are the same entity for a given transaction.

In the example described above, the example display device 560 may be a physical, printed sign on which a "static" QR code 562 is printed. Alternatively, the example display device 560 may be an electronic display device such as a display screen to allow the "static" QR code 562 to be changed from time to time as necessary. As alternative or in addition to a visible display that is read by a camera, the example display device 560 may be a NFC tag and/or a Bluetooth device that allows the customer mobile device to read the "static" code 562 electronically from the display device 560. In any of these cases, the customer mobile device 532 is capable of sensing or otherwise generating the "static" code data from the "static" code displayed by the example display device 560.

Figure 15:
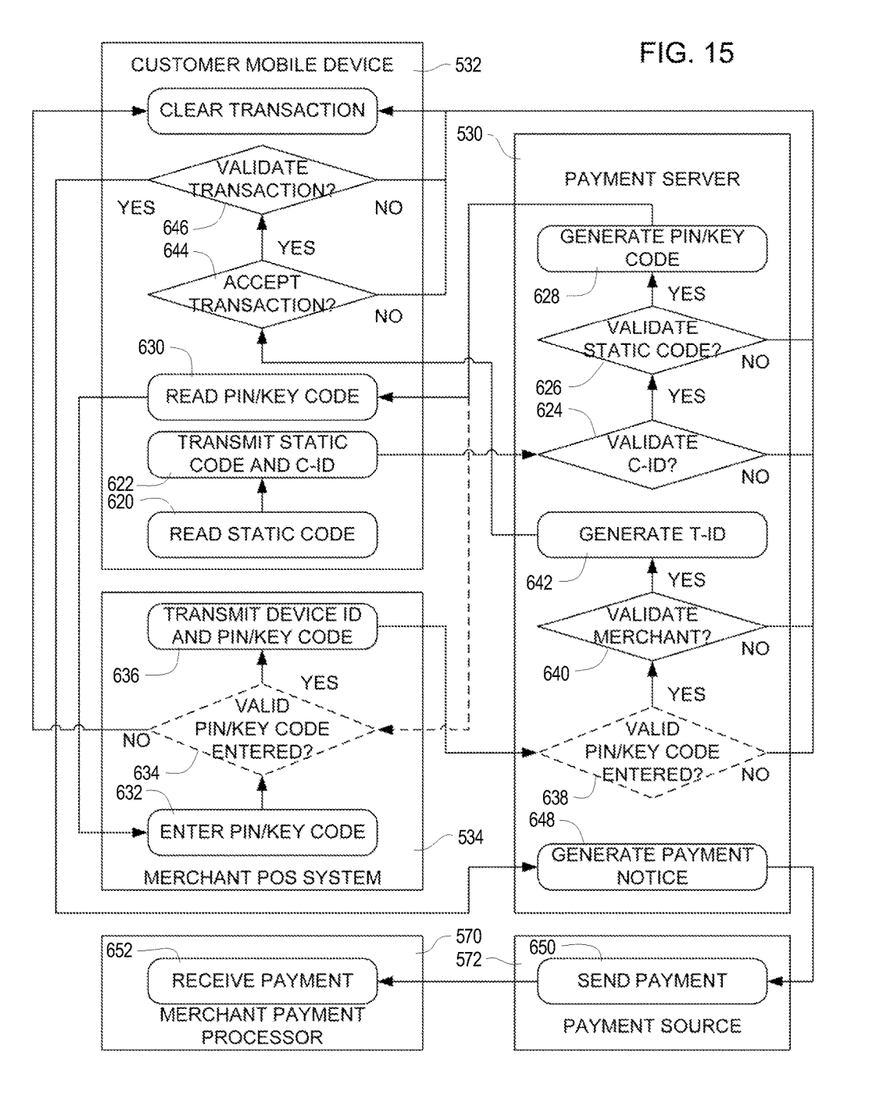
FIG. 15 is a flow chart illustrating the interactions among the components of the example electronic payment processing system of FIG. 13 when performing another example electronic payment processing method.

Turning now to FIG. 15 of the drawing, it can be seen that the principles of the present invention may be embodied as a method that employs the example payment processing system 520 to process payments from the customer to the merchant.

Initially, as shown at step 620, the customer uses the example customer mobile device 532 to read (e.g., take a photograph of, download) the "static" code 562 from the display device 560. In the primary example described above, the customer uses the iPhone to scan the static code from a sign or placard at the front of a gas pump island, grocery store lane, or ATM machine. The display device 560 will typically further comprise display markings that would identify the owner and/or location of the POS system 534.

At a step 622, the example customer mobile device 532 then transmits a transaction request comprising the static code data and a customer identification code (C-ID) unique to the customer or customer mobile device 532 to the payment server 530. In particular, the transaction request includes the data from the scan and data to identify the customer.

At a step 624, the payment server 530 next verifies that the C-ID is valid by comparing the specific C-ID received during the transaction with a database of valid C-ID's. At a step 626, the payment server validates the static code by comparing the static code with a database of valid static codes. Additional verification steps may be taken at step 626, such as comparing a location of the customer mobile device 532 as detected by GPS on the customer mobile device 532 with a known location of the merchant POS system 534. In this case, location data will also be transmitted from the customer mobile device 532 to the payment server 530 at the step 622.

After validating the C-ID (step 624) and the "static" code data (step 626), the payment server 530 initiates a new transaction at step 628 and returns a PIN/Key code number to the customer's device. The PIN/Key code number is unique, at least for that POS device 534 (e.g., POS owner and location. Optionally, the PIN/Key code number may also be transmitted to the merchant POS system 534 at step 628.

At step 630, the customer mobile device 532 displays the PIN/Key code number and the customer reads the PIN/Key code number. At step 632, the customer enters the PIN/Key code number into the merchant POS system 534 at the retail location. As one option, at a step 634 the merchant POS system 534 verifies that the PIN/Key code entered at the merchant POS system 534 and transmits the PIN/Key code and the device ID of the merchant POS system 534 to the payment server 530 at step 636. As another option, the merchant POS system 534 transmits the PIN/Key code and the device ID of the merchant POS system 534 to the payment server 530 at step 636, and the PIN/Key code is verified at the payment server 530 at a step 638.

At step 640, the payment server 530 validates the merchant, and the payment server 530 generates a transaction identification number (T-ID) at step 642. The customer may be given the option to accept the transaction at a step 644 and validate the transaction at a step 646, after which the payment server 530 generates a payment notice at step 648. The payment server 530 communicates the payment notice to the payment source 570 associated with the customer, and, at a step 650, the payment source 570 sends the payment to the merchant payment processor 572 associated with the merchant. The merchant payment processor 572 receives the payment at a step 652 and deposits the payment into the merchant's account.

As generally discussed above, the merchant POS system 534 may take the form of an ATM machine. In this case, the transaction flow would basically be same as other transactions described above, except that "purchase" may include the step of allowing the user to specify an amount of cash to be dispensed from the cash machine. In the context of an ATM machine, the processing systems and methods of the present invention may use the dynamic code or could be set up to use the "static" code and PIN configuration.

What is claimed is:

1. A system for processing payments from a customer to a merchant comprising:
    a merchant POS system associated with the merchant;
    a customer mobile device having a touch sensitive screen; and
    a payment server; whereby
    the customer inputs a plurality of handwritten calibration signatures using the touch sensitive screen;
    at least one of the customer mobile device and the payment server generates a reference signature based on variations between at least two of the plurality of handwritten calibration signatures;
    the payment server generates a Transaction ID unique to a payment transaction;
    in response to the generation of the Transaction ID, the customer inputs a handwritten transaction signature using the touch sensitive screen of the customer mobile device, where the payment transaction is validated by determining whether the handwritten transaction signature is within at least one tolerance relative to the reference signature; and
    the payment server generates a payment notice when the payment transaction is validated.

2. A payment processing system as recited in claim 1, in which the merchant POS system presents the Transaction ID to the customer mobile device in preparation for the payment transaction.

3. A payment processing system as recited in claim 2, in which:
    the merchant POS system generates a Transaction ID request in preparation for the payment transaction, and
    the payment server generates the Transaction ID upon receipt of the Transaction ID request.

4. A payment processing system as recited in claim 2, in which:
    the merchant POS system comprises a screen, where the merchant POS system displays a visible QR code on the screen to present the Transaction ID; and
    the customer mobile device comprises a sensor capable of reading the Transaction ID from the visible QR code.

5. A payment processing system as recited in claim 2, in which:
    the merchant POS system comprises a Bluetooth transmitter, where the merchant POS system presents the transaction ID by transmitting a Bluetooth signal containing the Transaction ID; and
    the customer mobile device comprises a sensor capable of converting the Bluetooth signal into the Transaction ID.

6. A payment processing system as recited in claim 2, in which:
    the merchant POS system comprises a NFC transmitter, where the merchant POS system presents the transaction ID by transmitting a NFC signal containing the Transaction ID; and
    the customer mobile device comprises a sensor capable of converting the NFC signal into the Transaction ID.

7. A payment processing system as recited in claim 1, in which the Transaction ID is unique to the payment transaction.

8. A payment processing system as recited in claim 1, in which:
   a static code is associated with the merchant POS system;
   the customer mobile device reads the static code and transmits the static code to the payment server;
   in response to receipt of the static code, the payment server sends a PIN/Key code to the customer mobile device;
   the customer mobile device displays the PIN/Key code;
   the customer enters the PIN/Key code into the merchant POS system; and
   the payment server generates the Transaction ID when the entered PIN/Key code is valid.

9. A payment processing system as recited in claim 8, in which:
   the merchant POS system comprises a sign, where the merchant POS system presents the static ID by displaying a visible QR code on the sign; and
   the customer mobile device comprises a sensor capable of generating the Transaction ID from the visible QR code.

10. A payment processing system as recited in claim 1, in which the customer mobile device generates the payment notice when the handwritten transaction signature substantially matches the reference signature.

11. A payment processing system as recited in claim 1, in which the customer mobile device generates the payment notice when the handwritten transaction signature is within a predetermined tolerance range relative to the reference signature.

12. A payment processing system as recited in claim 1, further comprising:
   a payment source associated with the customer; and
   a merchant payment processor associated with the merchant; whereby
   the payment source sends a payment to the merchant payment processor in response to the payment notice.

13. A method for processing payments from a customer using a customer mobile device having a touch sensitive screen to a merchant using a merchant POS system comprising the steps:
   causing a merchant application to run on the merchant POS system;
   causing a customer application to run on the customer mobile device;
   inputting a plurality of handwritten calibration signatures using the touch sensitive screen;
   causing at least one of the customer application and a payment server to generate a reference signature based on variations between at least two of the plurality of handwritten calibration signatures;
   inputting a handwritten transaction signature using the touch sensitive screen of the customer mobile device;
   operating the customer application to validate a payment transaction based on a Transaction ID unique to the payment transaction and by determining whether the handwritten transaction signature is within at least one tolerance relative to the reference signature; and
   generating a payment notice when the payment transaction is validated.

14. A method as recited in claim 13, further comprising the steps of:
   operating the merchant application to generate a Transaction ID request in preparation for the payment transaction, and
   generating the Transaction ID in response the Transaction ID request.

15. A method as recited in claim 13, further comprising the steps of:
   operating the merchant application such that the merchant POS system presents the Transaction ID by displaying a visible QR code on the screen; and
   operating the customer application to cause the customer mobile device generating the Transaction ID from the visible QR code.

16. A method as recited in claim 13, further comprising the steps of:
   operating the merchant application such that the merchant POS system presents the transaction ID by transmitting a signal containing the Transaction ID; and
   operating the customer application such that the customer mobile device converts the signal into the Transaction ID.

17. A method as recited in claim 13, further comprising the steps of:
   associating a static code with the merchant POS system;
   operating the customer application such that the customer mobile device reads the static code and transmits the static code to the payment server;
   in response to receipt of the static code, the payment server sends a PIN/Key code to the customer mobile device;
   the customer mobile device displays the PIN/Key code; and
   the customer enters the PIN/Key code into the merchant POS system.

18. A method as recited in claim 13, further comprising the step of operating the customer application to validate the payment transaction using a biometric identifier sensed by the customer mobile device, where the biometric identifier is unique to the customer.

19. A method as recited in claim 13, in which the customer mobile device generates the payment notice when the handwritten transaction signature substantially matches the reference signature.

20. A method as recited in claim 13, in which the customer mobile device generates the payment notice when the handwritten transaction signature is within a predetermined tolerance range relative to the reference signature.

* * * * *